Figures 1, 2:
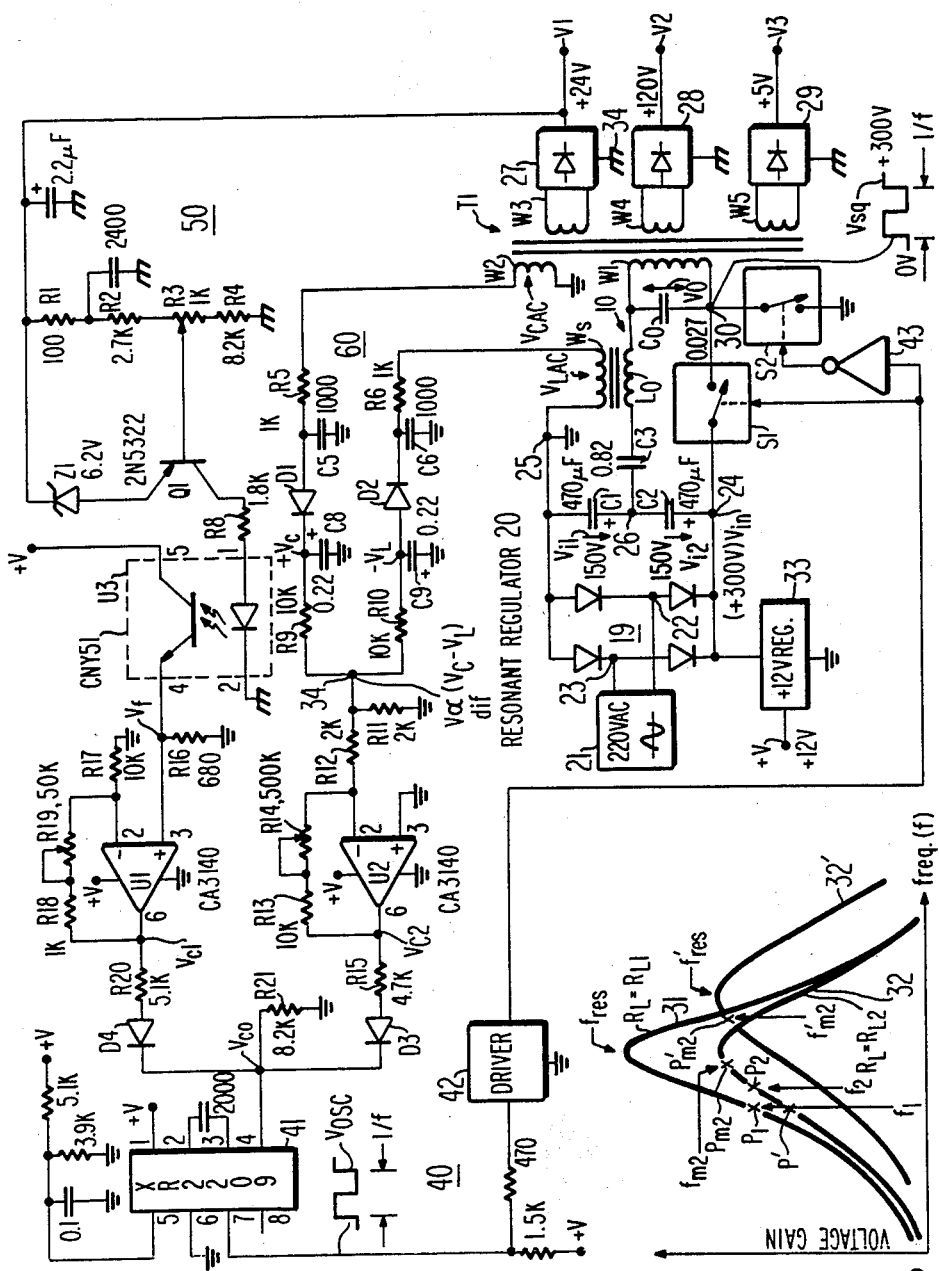

United States Patent [19]

Truskalo

[11] Patent Number: 4,729,085
[45] Date of Patent: Mar. 1, 1988

[54] FREQUENCY LIMITED RESONANT REGULATOR USEFUL IN, FOR EXAMPLE, A HALF-BRIDGE INVERTER

[75] Inventor: Walter Truskalo, Titusville, N.J.

[73] Assignee: RCA Corporation, Princeton, N.J.

[21] Appl. No.: 946,867

[22] Filed: Dec. 29, 1986

[51] Int. Cl.[4] .............................................. H02M 3/315
[52] U.S. Cl. ...................................... 363/56; 363/17; 363/79; 363/98
[58] Field of Search ........................ 363/16, 17, 25, 56, 363/79, 80, 98, 75; 323/248

[56] References Cited

U.S. PATENT DOCUMENTS

| | | | |
|---|---|---|---|
| 3,894,280 | 7/1975 | Bishop et al. | 363/25 |
| 4,301,398 | 11/1981 | Johnson | 363/57 |
| 4,504,895 | 3/1985 | Steigerwald | 363/17 |
| 4,631,652 | 12/1986 | Wendt | 363/16 |
| 4,670,832 | 6/1987 | Park | 363/98 |
| 4,672,528 | 6/1987 | Park et al. | 363/98 |

OTHER PUBLICATIONS

Dobberstein, "Very High Frequency FM–Regulated Power Supply with Enhanced Output Power Capability", IBM Tech. Discl. Bul., vol. 27, No. 9, pp. 5419–5421, Feb. 1985.

*Primary Examiner*—William H. Beha, Jr.
*Attorney, Agent, or Firm*—Eugene M. Whitacre; Paul J. Rasmussen; Joseph J. Laks

[57] ABSTRACT

In a resonant regulator power supply, a resonant circuit is coupled to a source of alternating input voltage that is controllable in operating frequency. A power transformer primary winding is coupled across the capacitive element of the resonant circuit for generating an output voltage across a secondary winding. A control circuit varies the operating frequency in a negative feedback loop to regulate the output voltage on the positive slope of the frequency characteristic curve. A frequency limiting circuit prevents the operating frequency from passing through the resonance frequency of the resonant circuit.

19 Claims, 2 Drawing Figures

FREQUENCY LIMITED RESONANT REGULATOR USEFUL IN, FOR EXAMPLE, A HALF-BRIDGE INVERTER

This invention relates to resonant regulator power supplies.

A resonant regulator operating on the positive slope of the resonant transfer characteristic curve regulates in an operating frequency range below the resonance frequency of the resonant circuit. If the control circuit of the resonant regulator attempts to locate the operating point above resonance, regulation is lost since the feedback changes from negative to positive feedback. The frequency control loop is therefore designed to avoid placing the operating point of the regulator on the erroneous side of the resonance frequency under all expected operating conditions.

The elements of the frequency control loop are subject to tolerances in the values of the resonant L and C components, to tolerances in the voltage feedback components, such as voltage divider resistors, and generally to tolerances throughout the control loop. Because of the large number of elements associated with the frequency control loop, it is relatively impractical to hold all tolerances small enough to insure that the operating point of the resonant regulator is below the resonance frequency under all foreseeable operating conditions. This is especially true when it is desirable to operate very close to the resonance frequency, where the slope of resonant transfer characteristic curve is steep and provides good loop response.

In accordance with an aspect of the invention, a resonant regulator power supply includes a resonant circuit coupled to and excited by a source of alternating input voltage, controllable in operating frequency. A supply circuit is coupled to the resonant circuit and generates an output voltage. A control circuit is coupled to the source and is responsive to the output voltage for varying the operating frequency in a negative feedback loop to regulate the output voltage. A frequency limiting circuit is coupled to the resonant circuit and prevents the operating frequency from passing through the resonance frequency.

As another feature of the invention, the frequency limiting circuit develops a first sense voltage representative of an inductive voltage developed by an inductive element of the resonant circuit and develops a second sense voltage that is representative of a capacitive voltage developed by a capacitive element. In carrying out an aspect of the invention, the two sense voltages are algebraically summed to provide a third sense voltage representative of the amplitude difference between the capacitive and inductive voltages. This difference voltage is indicative of the closeness of the operating frequency of the regulator to the resonance frequency of the resonant circuit. The frequency limiting circuit, in response to the difference voltage, prevents the operating frequency from passing through the resonance frequency.

FIG. 1 illustrates a resonant regulator power supply in accordance with the invention; and FIG. 2 illustrates resonant transfer characteristic curves associated with the operation of the circuit of FIG. 1.

In resonant regulator 20 of FIG. 1, a source 21 of AC mains voltage is coupled between input terminals 22 and 23 of a full-wave bridge rectifier 19, to develop a DC unregulated input voltage $V_{in}$ between a supply terminal 24 and a current return or ground 25 that is electrically nonisolated from mains source 21. Filtering of voltage $V_{in}$ is provided by equal-valued, series-coupled, capacitors C1 and C2. The unregulated DC voltages $V_{i1}$ and $V_{i2}$, developed across respective capacitors C1 and C2, are substantially equal in magnitude, at one-half the magnitude of voltage $V_{in}$. A voltage regulator 33 supplies a low DC voltage $+V$ for the control circuitry of resonant regulator 20.

An LC resonant circuit 10 includes an inductor $L_0$ and a capacitor $C_0$ series coupled at one end to an intermediate supply terminal 26 via a DC blocking capacitor C3, and at the other end to a square-wave input terminal 30. Resonant circuit 10 is coupled to and excited by a source 40 of alternating, square-wave, input voltage $V_{sq}$, controllable in frequency f.

Square-wave voltage source 40 comprises a frequency controllable oscillator 41, that generates a square-wave oscillator voltage $V_{osc}$, a driver stage 42, and push-pull switches S1 and S2. To assume a push-pull configuration, switch S1 is coupled between supply terminal 24 and square-wave input terminal 30, and switch S2 is coupled between input terminal 30 and nonisolated ground. In order to operate switches S1 and S2 in a push-pull manner, the output of driver 42 is inverted by an inverter 43 before being applied to switch S2. Capacitor C3 blocks any residual DC introduced by asymmetrical switching operation or by unequal values for capacitors C1 and C2.

In operation, square-wave input voltage $V_{sq}$ excites resonant circuit 10 into oscillation to develop a generally sinusoidal supply voltage $V_0$ across resonant capacitor $C_0$. Voltage $V_0$ has a fundamental frequency at the exciting or operating frequency f of square-wave input voltage $V_{sq}$. The voltage developed across resonant inductor $L_0$ is also a generally sinusoidal wave of frequency f that, however, exhibits step changes in voltage magnitude during leading and trailing edge transitions of voltage $V_{sq}$. The phasing between square-wave voltage $V_{sq}$ and the sinusoidal components of the inductive and capacitive voltages varies with load and with AC mains voltage variations.

A primary winding W1 of a power transformer T1 is coupled across resonant capacitor $C_0$ of resonant circuit 10. The inductance exhibited by winding W1 may affect the resonance frequency of resonant circuit 10, depending on its value relative to that of inductor $L_0$.

Voltage $V_0$ is applied across primary winding W1 and develops sinusoidal output voltages across tightly coupled secondary windings W3–W5. These voltages are rectified and filtered by respective elements 27–29 to develop respective DC supply voltages V1–V3 that energize respective load circuits not shown in FIG. 1. Power transformer T1 also provides electrical shock hazard isolation between mains voltage source 21 and the load circuits energized by supply voltages V1–V3. Thus, the current return path or ground termination for the secondary side load circuits of transformer T1 is electrically isolated from ground 25 on the primary side.

A frequency control circuit 50 forms a negative feedback loop that regulates supply voltages V1–V3 with variations in main supply voltage and loading. To regulate the output voltages, one of the output voltages, illustratively voltage V1, is directly coupled to the emitter of a PNP error amplifier transistor Q1 via a level shifting, voltage reference, zener diode E1. Voltage V1 is also coupled to the base of transistor Q1 via a voltage divider resistance network R1–R4, with the base being coupled to an adjustable intermediate point of the voltage divider.

The collector of transistor Q1 is coupled via a collector load resistor R8 to an input pin 1 of an opto-isolator amplifier U3 for developing a feedback voltage $V_f$ across load resistor R16 coupled to an output pin 4. Amplifier U3 may be selected as opto-isolator CNY51, manufactured by the Semiconductor Products Department, General Electric Company, Auburn, N.Y.

Feedback voltage $V_f$ is coupled to a noninverting input terminal of an amplifier U1 to develop at the output of amplifier U1 a frequency control voltage $V_{c1}$. The inverting input terminal of amplifier U1 is grounded via a resistor R17. Linear operation of amplifier U1 is provided by feeding back voltage $V_{c1}$ to the inverting input terminal via resistors R18 and R19. The gain of amplifier U1 is determined by the value of this feedback resistance.

During normal regulator operation, frequency control voltage $V_{c1}$ is applied to a frequency control input pin 4 of oscillator 41 via a resistor R20 and a pass-through diode D4. The frequency control voltage $V_{c0}$, that is developed across a resistor R21 coupled to frequency control pin 4, varies in accordance with feedback frequency control voltage $V_{c1}$.

FIG. 2 illustrates typical resonant transfer characteristic curves associated with the operation of resonant regulator 20. Curve 31, for example, illustrates a transfer characteristic for a given level of unregulated voltage $V_{in}$ when power transformer T1 is loaded by an equivalent resistance $R_L = R_{L1}$.

Frequency control circuit 50 controls operating frequency f so as to establish an operating point $P_1$ on curve 31 at a frequency $f_1$ that regulates output supply voltage V1 to its desired level. From the location of operating point $P_1$ on the positive slope of transfer characteristic curve 31, one notes that frequency control circuit 50 is designed to regulate at frequencies below, or to the left side of, resonance frequency $f_{res}$.

Assume now that the loading on power transformer T1 increases from an equivalent load resistance $R_{L1}$ to a smaller resistance $R_{L2}$. The resonant transfer characteristic curve of resonant circuit 10 for the new operating condition is curve 32 of FIG. 2. The resonance frequency for curve 32 will be very close to that of resonance frequency $f_{res}$ of curve 31. Due, however, to the increased loading on resonant circuit 10, the peak of curve 32 is lower than that of curve 31, and the slope of the curve on either side of resonance is less steep.

If frequency control circuit 50 were unable to respond to the increased loading, and the operating frequency were to remain at frequency $f_1$, the new operating point $P'$ would be at a point on curve 32 that results in decreased amplitude for sinewave input voltage $V_0$, and decreased levels for supply voltages V1–V3. Frequency control circuit 50, however, will respond to the tendency of supply voltage V1 to decrease under increased loading by changing the operating frequency to a higher frequency $f = f_2$. The higher operating frequency establishes a new operating point $P_2$ on curve 32 that restores the voltage level V1 to its correct, regulated level.

Frequency control circuit 50 operates in the following manner to, for example, increase the operating frequency as increased loading attempts to decrease supply voltage V1. The decrease in supply voltage V1, being directly coupled to the emitter of transistor Q1 via zener diode Z1, while being only proportionally coupled to the base via divider R1–R4, produces a decrease in transistor conduction. The decrease in conduction of transistor Q1 produces a decrease in feedback voltage $V_f$ that is amplified by amplifier U1 to produce a decrease in frequency control voltage $V_{c1}$. The decrease in frequency control voltage $V_{c1}$ is passed through diode D4 as a decrease in oscillator frequency control voltage $V_{c0}$ developed at frequency control pin 4 of the oscillator.

Oscillator 41 may be selected as Precision Oscillator XR-2209, manufactured by EXAR Integrated Systems, Inc., Sunnyvale, Calif. Oscillator 41 is designed to respond to a decrease in frequency control voltage $V_{c0}$ in a way that increases the oscillator frequency. Thus, in response to a decrease in supply voltage V1, the operating frequency of resonant circuit 10 increases, in accordance with the gain of the negative feedback loop provided by control circuit 50. This establishes the new operating point $P_2$ on curve 32 of FIG. 2 at the higher frequency $f = f_2$, so as to restore the supply voltages to their regulated levels.

It may be desirable to design resonant regulator 20 to have a normal operating frequency range that closely approaches the resonance frequency of resonant circuit 10 at the extremes of the operating range. Such a design choice insures that the regulator operates on the relatively steep portion of the resonant transfer characteristic curve, thereby providing good loop response and a relatively wide range of regulation.

Due, however, to circuit tolerances, the operating point of the regulator on a given transfer characteristic curve may be so close to the resonance frequency that frequency control circuit 50 will attempt to locate the operating point on the negative slope of, for example, curve 32. Should a situation arise where the operating frequency passes through the resonance frequency regulation is completely lost, because frequency control circuit 50 will now operating in a positive feedback mode. For example, control circuit 50 will respond to a decrease in supply voltage V1 by increasing rather than decreasing the operating frequency, which produces a further decrease in supply voltage.

In accordance with an aspect of the invention, resonant regulator 20 includes a frequency limiting circuit 60 that prevents the operating frequency from passing through resonance. In frequency limiting circuit 60, the voltage developed by inductive element $L_0$ of resonant circuit 10 is sensed by a secondary winding $W_s$ magnetically coupled to inductor $L_0$. The amplitude of the voltage $V_{LAC}$, developed by inductive sense winding $W_s$, varies with operating frequency. For example, the amplitude of voltage $V_{LAC}$ increases with increasing operating frequency f.

Frequency limiting circuit 60 also senses the amplitude of voltage $V_0$ developed across capacitive element $C_0$ of resonant circuit 10. The capacitive voltage is sensed by a secondary winding W2 of transformer T1 that is tightly coupled with primary winding W1. The voltage $V_{CAC}$ across winding W2 is a transformed voltage representative of capacitive voltage $V_0$. Although the capacitive impedance exhibited by capacitor $C_0$ decreases with increasing operating frequency, the amplitude of voltage $V_{CAC}$ tends to remain unchanged under normal operating conditions due to the regulation provided by resonant regulator 20.

Capacitive voltage $V_{CAC}$ is lowpass filtered by a resistor R5 and a capacitor C5, rectified by a diode D1 to charge a capacitor C8 that develops a positive DC sense voltage $+V_C$, having a magnitude that is in accordance with the amplitude of voltage $V_{CAC}$. Inductive voltage $V_{LAC}$ is lowpass filtered by a resistor R6 and a capacitor C6, rectified by a diode D2 to charge a capacitor C9 that develops a negative DC sense voltage $-V_L$ having a magnitude that is in accordance with the amplitude of voltage $V_{LAC}$.

Capacitive sense voltage $+V_C$ and inductive sense voltage $-V_L$ are algebraically summed via respective resistors R9 and R10 to develop a difference voltage $V_{dif}$ across a resistor R11 coupled to a summing junction terminal 34. Voltage $V_{dif}$ is therefore proportional to the difference in magnitudes between the capacitive sense voltage and the inductive sense voltage, or $V_{dif} \propto (V_C - V_L)$.

Voltage $V_{dif}$ is applied to the inverting input terminal of an amplifier U2 having a noninverting input terminal that is grounded. The output of amplifier U2 is coupled to frequency control pin 4 of oscillator 41 via a resistor R15 and a diode D3. Negative feedback for amplifier U2 is provided by resistors R13 and R14 series coupled between the output terminal and the inverting input terminal. Amplifiers U1 and U2 may each be selected as CA3140, manufactured by the Solid State Division of RCA Corporation, Somerville, N.J.

By properly selecting the number of turns for windings W2 and $W_s$, the magnitude of inductive sense voltage $V_L$ is maintained smaller than the magnitude of the capacitance sense voltage $V_C$, within the normal operating frequency range below resonance. The difference voltage $V_{dif}$ is a positive value.

A positive voltage $V_{dif}$, when applied to the inverting input terminal of amplifier U2, produces cutoff of amplifier U2. Since the voltage at frequency control pin 4 is positive during normal operation of resonant regulator 20, diode D3 is reverse biased and blocks the voltage at the output of amplifier U2 from passing through to pin 4 and affecting the normal operation of the negative feedback loop formed by frequency control circuit 50.

As the operating frequency of resonant regulator 20 is increased and moves the operating point towards resonance on, for example, characteristic curve 32 of FIG. 2, an operating point $P_{m2}$ is reached at a frequency $f_{m2}$ where the magnitude of inductive sense voltage $-V_L$ has increased sufficiently to reverse the polarity of voltage $V_{dif}$ and produced a negative value for the voltage. Control voltage $V_{c2}$, developed at the output of amplifier U2, becomes a positive-valued voltage.

The feedback resistance of amplifier U2 is selected to be much greater than the feedback resistance of amplifier U1, illustratively 10 or more times greater. The voltage gain of amplifier U2 is advantageously much greater than the voltage gain of amplifier U1.

When voltage $V_{dif}$ becomes negative at frequency $f_{m2}$, any slight further increase in frequency will produce a relatively large increase in positive control voltage $V_{c2}$. Diode D3 becomes forward biased, to pass through voltage $V_{c2}$ to frequency control pin 4 of oscillator 41. Diode D4 becomes reversed biased and blocks voltage $V_{c1}$ from being applied to frequency control pin 4. Oscillator frequency control voltage $V_{c0}$ is now controlled exclusively by control voltage $V_{c2}$. The negative feedback loop provided by frequency control circuit 50 becomes disabled, and any attempt to further increase the operating frequency will be ineffective due to the higher gain of amplifier U2 relative to that of amplifier U1. Furthermore, for frequency control circuit 50 to increase the operating frequency, it must decrease frequency control voltage $V_{c1}$. This would further increases the reverse biasing potential across diode D4. In these ways, frequency limiting circuit 60 prevents the resonant regulator operating frequency from increasing beyond frequency $f_{m2}$.

Advantageously, frequency limiting circuit 60 automatically holds the upper frequency limit of operation to a given design guard band below the resonance frequency, even though the resonance frequency itself may differ from the design value due to component tolerances, temperature, and aging effects. The relative magnitudes of the AC voltages across inductive element $L_0$ and capacitive element $C_0$ of resonant circuit 10 track each other near resonance. Voltage $V_{dif}$, which is indicative of the closeness of the operating frequency to resonance, is proportional to the difference in magnitudes of the inductive and capacitive voltages. Voltage $V_{dif}$ is a monotonic function in the region of interest to either side of resonance on the transfer characteristic curve, with voltage $V_{dif}$ reversing polarity as the frequency closes to near resonance.

By designing the reversal of polarity to occur before resonance is reached, voltage limiting circuit 60 may be activated at a limit-frequency below resonance that is relatively independent of tolerances, temperature and component aging. Thus, when the effects of tolerance, temperature and component aging produces a different resonant transfer characteristic curve having a different resonance frequency $f'_{res}$, in curve 32' of FIG. 2, frequency limit circuit 60 still provides a limiting action. The regulator operating point and frequency will be driven to just below resonance to, for example, point $P'_{m2}$, at a high-limit frequency $f'_{m2}$. Furthermore, since voltage $V_{dif}$ is monotonic through resonance, voltage $V_{dif}$ is able to limit the operating frequency without experiencing the reversal from negative feedback operation to positive feedback operation that frequency control circuit 50 is subject to.

Frequency limiting circuit 60 advantageously provides frequency limiting under short-circuit load conditions. Should a short-circuit load be developed by power transformer T1, input voltage $V_0$ and capacitive sense voltage $+V_C$ will be absent or much reduced in amplitude, while inductive sense voltage $-V_L$ will be substantially increased in amplitude. The difference voltage $V_{dif}$ will become negative and drive control voltage $V_{c0}$ to a relatively large value that blocks diode D4 and drives the operating frequency below resonance.

By way of illustration only, the following values may be chosen for inductor $L_0$ and transformer T1, assuming negligible leakage. Inductor $L_0$ has an inductance of 440 microhenry and a ratio of turns for $W_s$ to turns for $L_0$ of 7:67. Transformer T1 develops an effective inductance across capacitor $C_0$ of 800 microhenry and a ratio of turns W2 to turns W1 of 5:49.

Illustrative operating frequencies for nominal component values are the following: an operating frequency of 56.4 kilohertz at a high AC mains voltage of 270 VAC, RMS and at an equivalent load of 100 watts; an operating frequency of 67 kilohertz at a low AC mains voltage of 180 VAC, RMS and at an equivalent load of 100 watts. The resonance frequency is approximately 77 kilohertz, with the high-limit frequency being approximately 75.5 kilohertz.

What is claimed:

1. A resonant regulator power supply, comprising:
   a source of alternating input voltage, controllable in operating frequency;
   a resonant circuit coupled to and excited by said source and having associated therewith a resonance frequency, said resonant circuit including an inductive element and a capacitive element;
   means coupled to said resonant circuit for generating an output supply voltage;
   a control circuit coupled to said source and responsive to said output supply voltage for varying said operating frequency in a negative feedback loop to regulate said output supply voltage; and
   a frequency limiting circuit coupled to said resonant circuit for preventing said operating frequency from passing through said resonance frequency, including means for developing a first sense voltage representative of an inductive voltage developed by said inductive element and means for developing a second sense voltage representative of a capacitive voltage developed by said capacitive element.

2. A power supply according to claim 1 wherein normal operation is in a range of said operating frequency that is below said resonance frequency.

3. A power supply according to claim 1 wherein normal operation is in a range of said operating frequency that is below said resonance frequency.

4. A power supply according to claim 1 wherein said first sense voltage developing means comprises a sense winding magnetically coupled to said inductive element.

5. A power supply according to claim 1 wherein said second sense voltage developing means includes a transformer having a first winding coupled to said capacitive element and having a second winding for developing said second sense voltage.

6. A power supply according to claim 5 wherein said first sense voltage developing means comprises a sense winding magnetically coupled to said inductive element.

7. A power supply according to claim 1 wherein said output supply voltage generating means includes a power transformer having a first winding coupled to said capacitive element, a second winding for generating said output supply voltage, and a third winding for developing said second sense voltage.

8. A power supply according to claim 7 wherein said first sense voltage developing means comprises a sense winding magnetically coupled to said inductive element.

9. A power supply according to claim 1 wherein said frequency limiting circuit includes means responsive to said first and second sense voltages for developing a third sense voltage indicative of a difference between said inductive and capacitive voltages.

10. A power supply according to claim 9 wherein said third sense voltage comprises the algebraic sum of said first and second sense voltages such that a magnitude of said third sense voltage is indicative of the closeness of said operating frequency to said resonance frequency.

11. A power supply according to claim 10 wherein a first polarity of said third sense voltage is indicative of said operating frequency being one of a below-resonance frequency and an above-resonance frequency.

12. A resonant regulator power supply, comprising:
    a source of alternating input voltage, controllable in operating frequency;
    a resonant circuit coupled to and excited by said source and having associated therewith a resonance frequency, said resonant circuit including an inductive element and a capacitive element;
    means coupled to said resonant circuit for generating an output supply voltage;
    a control circuit coupled to said source and responsive to said output supply voltage for varying said operating frequency in a negative feedback loop to regulate said output supply voltage, including means for generating, in accordance with said negative feedback loop, a first frequency control signal that varies in a given manner as said operating frequency approaches said resonance frequency from a given direction; and
    a frequency limiting circuit coupled to said resonant circuit for preventing said operating frequency from passing through said resonance frequency, including means for generating a second frequency control signal that varies in a manner opposite that of said first control signal as said operating frequency approaches said resonance frequency from said given direction.

13. A power supply according to claim 12 wherein said control circuit includes means for supplying said first frequency control signal to said source of alternating input voltage when said operating frequency is within a given frequency range that is on one side of said resonance frequency and for supplying said second frequency control signal when said operating frequency is within a given limit of said resonance frequency.

14. A power supply according to claim 12 wherein said frequency limiting circuit substitutes said second frequency control signal when said operating frequency is within a given limit of said resonance frequency.

15. A resonant regulator power supply, comprising:
    a source of alternating input voltage, controllable in operating frequency;
    a resonant circuit coupled to and excited by said source and having associated therewith a resonance frequency, said resonant circuit including an inductive element and a capacitive element;
    means coupled to said resonant circuit for generating an output supply voltage;
    a control circuit coupled to said source and responsive to said output supply voltage for varying said operating frequency in a negative feedback loop to regulate said output supply voltage, including a first amplifier for amplifying a negative feedback voltage representative of said output supply voltage; and
    a frequency limiting circuit coupled to said resonant circuit for preventing said operating frequency from passing through said resonance frequency, including means coupled to said resonant circuit for generating first and second AC signals and means including a second amplifier responsive to said first and second AC signals for generating a frequency sense voltage that is indicative of the closeness of said operating frequency to said resonance frequency.

16. A resonant regulator power supply, comprising:
    a source of alternating input voltage, controllable in operating frequency;
    a resonant circuit coupled to and excited by said source and having associated therewith a resonance frequency, said resonant circuit including an inductive element and a capacitive element;

means coupled to said resonant circuit for generating an output supply voltage;

a control circuit coupled to said source and responsive to said output supply voltage for varying said operating frequency in a negative feedback loop to regulate said output supply voltage, including a first amplifier for amplifying a negative feedback voltage representative of said output supply voltage; and a frequency limiting circuit coupled to said resonant circuit for preventing said operating frequency from passing through said resonance frequency, including a second amplifier having a gain that is substantially greater than that of said first amplifier for amplifying a frequency sense voltage that is indicative of the closeness of said operating frequency to said resonance frequency.

17. A resonant regulator power supply, comprising:
a source of alternating input voltage, controllable in operating frequency;
a resonant circuit coupled to and excited by said source and having associated therewith a resonance frequency, said resonant circuit including an inductive element and a capacitive element;
means coupled to said resonant circuit for generating an output supply voltage;
a control circuit coupled to said source and responsive to said output supply voltage for varying said operating frequency in a negative feedback loop to regulate said output supply voltage, including a first amplifier for amplifying a negative feedback voltage representative of said output supply voltage;
a frequency limiting circuit coupled to said resonant circuit for preventing said operating frequency from passing through said resonance frequency, including a second amplifier from amplifying a frequency sense voltage that is indicative of the closeness of said operating frequency to said resonance frequency; and
means for combining outputs of said first and second amplifiers, wherein a magnitude of the output of said first amplifier tends to vary in a given sense when said operating frequency varies in a first direction, whereas a magnitude of the output of said second amplifier tends to vary in an opposing sense.

18. A resonant regulator power supply, comprising:
a source of alternating input voltage, controllable in operating frequency;
a resonant circuit coupled to and excited by said source and having associated therewith a resonance frequency, said resonant circuit including an inductive element and a capacitive element;
means coupled to said resonant circuit for generating an output supply voltage;
a control circuit coupled to said source and responsive to said output supply voltage for varying said operating frequency in a negative feedback loop to regulate said output supply voltage, including a first amplifier for amplifying a negative feedback voltage representative of said output supply voltage;
a frequency limiting circuit coupled to said resonant circuit for preventing said operating frequency from passing through said resonance frequency, including a second amplifier for amplifying a frequency sense voltage that is indicative of the closeness of said operating frequency to said resonance frequency; and
a switching arrangement coupled to the two amplifiers for preventing said source of alternating input voltage from responding to said frequency sense voltage when said operating frequency is within a first range of frequencies on one side of said resonance frequency and for preventing said source from responding to said negative feedback voltage when said operating frequency is within a given limit of said resonance frequency.

19. A power supply according to claim 18 wherein said switching arrangement comprises first and second diodes series coupled with respective outputs of said first and second amplifiers, said frequency sense voltage blocking conduction of said first diode when said operating frequency approaches said resonance frequency to within said given limit.

* * * * *